United States Patent [19]
Snyder

[11] 4,082,944
[45] Apr. 4, 1978

[54] BAND TIMING GENERATOR

[75] Inventor: Robert Snyder, Melbourne, Fla.

[73] Assignee: Documation, Inc., Melbourne, Fla.

[21] Appl. No.: 731,652

[22] Filed: Oct. 12, 1976

[51] Int. Cl.² .......................................... G06K 15/08
[52] U.S. Cl. ................................... 235/309; 101/93.18
[58] Field of Search ................. 235/309; 101/93.18, 101/93.21; 197/49; 307/208, 269; 328/63; 364/900

[56] References Cited

U.S. PATENT DOCUMENTS

| | | | |
|---|---|---|---|
| 3,629,861 | 12/1971 | Marsh, Jr. et al. | 364/900 |
| 3,731,780 | 5/1973 | Wolf et al. | 197/49 |
| 4,009,654 | 3/1977 | Harris et al. | 101/93.18 |

OTHER PUBLICATIONS

Burke and Miller, Print Error Detector, IBM Technical Disclosure Bulletin, vol. 13, No. 3, Aug. 1970, pp. 664–666.

*Primary Examiner*—Charles E. Atkinson
*Attorney, Agent, or Firm*—Duckworth, Hobby, Allen & Pettis

[57] ABSTRACT

This invention relates to a method and apparatus for reading periodic timing marks from a moving printing band and for generating synchronous timing marks during the passage of a missing timing mark on the printing band. Two timing mark sensors are positioned adjacent the printing band or belts but spaced from each other by a distance several multiples of the spacing between timing marks. The downstream or primary sensor is used to detect the passage of timing marks adjacent thereto. When the missing pulse passes the upstream or secondary detector, an electronic switch transfers the output line to the upstream sensor until the missing pulse passes the primary sensor. As the missing timing pulse passes the primary sensor, the switch is actuated to couple the output line again to the primary sensor. In this manner a continous stream of synchronized timing pulses will be generated by the sensors even during the period when the missing timing pulse passes adjacent the primary sensor.

12 Claims, 2 Drawing Figures

BAND TIMING GENERATOR

BACKGROUND OF THE INVENTION

I. Field of the Invention

This invention relates generally to computer band printers and more specifically to a method and apparatus for generating continuous position pulses during the passage of a missing pulse on the printing band adjacent to the detector.

II. Description of the Prior Art

Computer operated high speed band printers must maintain complete synchronization between the mechanical position of each of the characters on a moving belt and the plurality of hammers which impact with the character for producing the printed lines. A proven solution to this problem involves placing timing marks at each character position along the timing belt. The location of each character is identified with reference to a start or reference position denoted by the absence of a timing mark. This missing pulse is known as the home position. While this system solves the problem of providing a reference pulse, the solution is not without problems. For example, as the missing pulse proceeds around the timing belt at fast speeds, additional electronics are required to generate a timing pulse at the proper position and time when the missing pulse is adjacent to the detector.

Various prior art systems have been developed for generating a pulse at this home position by averaging the time differential between adjacent timing marks and then generating the missing timing mark based upon this average of previous values. However, this solution does not account for instantaneous or relatively fast variations in the speed of the belt which regularly occur during normal operation. Errors in the timing of the missing pulse are displayed as a lateral offset in the characters printed responsive to the missing pulse.

The prior art discloses several different systems of speed control and position measurement. See for example the disclosures of Favard in U.S. Pat. No. 3,795,852, Baker et al in U.S. Pat. No. 3,317,804, Willis in U.S. Pat. No. 3,277,357, Bin-Lun Ho in U.S. Pat. No. 3,217,170, Tomek in U.S. Pat. No. 3,135,903, and Raymond in U.S. Pat. No. 3,117,266.

SUMMARY OF THE INVENTION

This invention relates to an apparatus and method for reading periodic timing marks from a moving timing band and for generating synchronous timing marks during the passage of a missing timing mark on the band.

The method comprises the steps of detecting the passage of each of the timing marks at a first location and detecting the passage of each of the timing marks at a second location spaced from the first location in a direction opposite the direction of motion of the timing band. When the missing timing mark is detected at the second location, an output line, which is normally coupled to a first detector at the first location, is switched to a second detector at the second location for maintaining the synchronous flow of timing marks through the output line during the period of time in which the missing timing pulse passes the first detector location. After the missing timing pulse passes the first detector, the output line is switched back to the first detector for sensing the passage of the remaining timing marks.

An apparatus in accordance with the present invention is provided for reading periodic timing marks from a moving band and for generating periodic timing marks in synchronism during the passage of a missing timing mark on the timing band. A first detector is positioned adjacent the moving timing band for sensing the passage of each of the timing marks thereon. A second detector is positioned adjacent the moving timing band for sensing the passage of each of the timing marks thereon, with the second detector being spaced from the first detector in a direction opposite the direction of motion of the timing belt. Primary missing mark means are coupled to the second detector for sensing the passage of the missing timing mark. Switch means are provided for coupling in a first position an output line to the first detector for receiving the timing marks therefrom, with the switch means switching to a second position with the output line coupled to the second detector responsive to the primary missing mark means sensing the passage of the missing timing mark adjacent thereto.

BRIEF DESCRIPTION OF THE DRAWINGS

Other objects, features and advantages of the present invention will be obvious from a study of the written description and the drawings in which.

DETAILED DESCRIPTION OF THE PREFERRED EMBODIMENT

Figure 1:
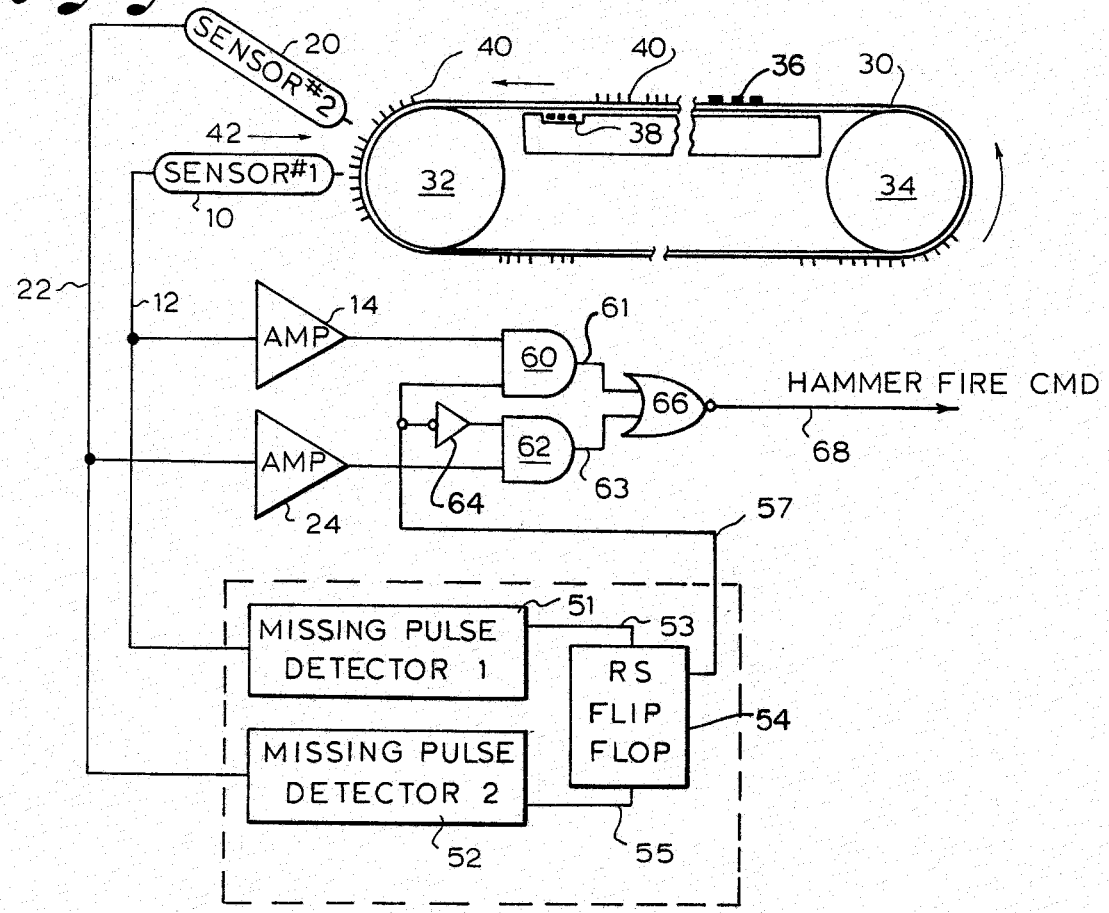
FIG. 1 illustrates a schematic block diagram of a first preferred embodiment of the band timing generator.

A first preferred embodiment in accordance with the present invention is illustrated in FIG. 1. A first detector or sensor 10 is located adjacent an endless loop timing band or belt 30 driven by drive wheels 32 and 34. The printing or timing band 30 contains thereon a plurality of characters 36 in registration with the alphanumeric font having a predetermined pitch or spacing therebetween. A plurality of hammers 38 are positioned within the loop of the timing band 30 for being remotely actuated to impact a selected one of the characters 36 for causing the imprint of the character upon a paper surface adjacent thereto. The timing band 30 is rotated at high speeds in the direction of the rotation arrow.

The first sensor 10 is located adjacent to the timing band 30. A second detector or sensor 20 is also mounted adjacent to the timing band 30, but it is spaced from the first sensor 10 in a direction opposite the direction of motion of the timing belt 30 by a distance equal to an integral number of spaces, each equal to the pitch between the characters 36 on the timing band 30. In the first preferred embodiment of the present invention the second detector 20 is spaced five increments of the character pitch from the first detector 10, but this distance may be varied as required as long as the separation between the first detector 10 and the second detector 20 is accurately determined to be an exact multiple of the character pitch. This spacing significantly reduces the complexity of the required electronics. The sensors 10 and 20 of the first preferred embodiment are magnetic sensors for sensing the passage of each of the magnetic timing marks 40 on the timing band 30. However, it will be obvious to one skilled in the art that optical or electrical sensing may be substituted for the magnetic sensing used herein without departing from the scope or spirit of the present invention.

The sequential pulse outputs from the first detector 10 are coupled through a circuit line 12 into the input of a first amplifier 14. The output of the first amplifier 14 is coupled to a first input of a first AND gate 60. The output of the first detector 10 is also coupled through the circuit line 12 to the input of a first missing pulse detector 51. The output of the first missing pulse detector 51 is coupled to a first input of an RS flip-flop 54.

The periodic pulse waveform generated by the second detector 20 is coupled through a circuit line 22 to the input of a second amplifier 24. The output of the second amplifier 24 is coupled to a first input of a second AND gate 62. Circuit line 22 is also coupled to an input of a primary missing pulse detector 52. The output of the primary missing pulse detector 52 is coupled by a circuit line 55 to a second input of the first AND gate 60 and to the input of an inverting gate 64. The output of the inverting gate 64 is coupled to a second input of a second AND gate 62. The outputs of the first AND gate 60 and the second AND gate 62 are coupled through circuit lines 61 and 63 respectively to the two inputs of a NOR gate 66. The output of the NOR gate 66 is coupled directly to the hammer fire control computer (not shown) through the output line 68.

The missing pulse detectors 51 and 52 comprise two single shot multivibrators (not illustrated). The first multivibrator is retriggerable, the seond is non-retriggerable. The time constant associated with the first multivibrator shot is such that its period is slightly longer than the input signal. Thus the main output is always high if the input frequency is above the time constant of the one shot. At the time the missing pulse occurs the period of the pulse waveform will appear to be longer than the time constant of the one shot. Since the input is now longer than the time constant of the first multivibrator, the output will fall. The falling of the main output of the first multivibrator causes the secong multivibrator to generate a single pulse.

Figure 2:
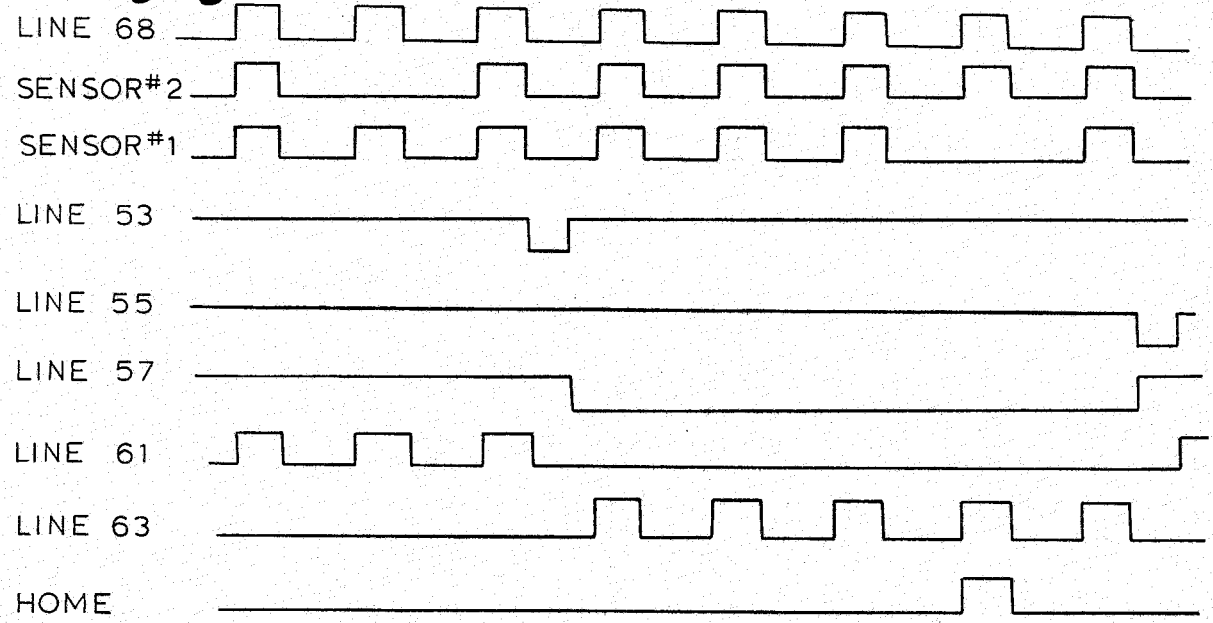
FIG. 2 illustrates a timing pulse output at specified locations in the circuitry shown in FIG. 1.

The operation of the first preferred embodiment of the present invention will now be illustrated with reference to FIG. 1. First, it will be assumed that the missing timing mark or home mark 42 has not yet reached the second detector 20. Under these conditions the first detector 10 will sense the passage of each of the timing marks 40 and responsive thereto will generate the pulse waveform as illustrated in FIG. 2. The output of the RS flip-flop will be high, thus enabling the pulse waveform output from the first detector 10 to pass through the circuit line 12, the first amplifier 14, the first AND gate 60 and the NOR gate 66 to the output line 68. The output of the inverting gate 64 will be zero causing the output of the second detector 20 to be blocked by the second AND gate 62. As the missing timing mark 42 passes adjacent to the second detector 20, the primary missing pulse detector 52 will be activated causing a change in the output of the RS flip-flop 54. This will disable the first AND gate 60 and enable the second AND gate 62 for allowing the pulse waveform output of the second detector 20 to pass through the second AND gate 62 and the NOR gate 66 onto the output line 68. The first AND gate 60 will be disabled by the output of the RS flip-flop 54.

Therefore, as the missing timing mark 42 passes the second detector 20, the output line will be switched from the first detector 10 to the second detector 20. The pulse waveform outputs will continue in synchronism since the first detector 10 and the second detector 20 are separated by an integral number of character pitch increments. As the missing timing mark 42 passes adjacent the first detector 10, the pulse waveform output of the second detector 20 will continue to supply the firing commands along the output line 68 to the hammer computer control. However, as the missing timing mark 42 passes adjacent the first sensor 10, the missing pulse detector 51 will be actuated, thereby causing the output of the RS flip-flop 54 to change. As the output of the RS flip-flop 54 changes, the second AND gate 62 will be disabled and the first AND gate 60 will again be enabled for allowing the flow of the pulse waveform from the first detector 10 through the first AND gate 60 and the NOR gate 66 into the output line 68.

In this manner the output line 68 will be continually supplied with a synchronous pulse waveform representing the passage of each of the timing marks 40 adjacent to the first detector 10, even during periods when the missing timing mark 42 passes adjacent thereto.

It should be apparent at this point that a new and useful method and apparatus for generating time and position signals have been described. The first preferred embodiment of an apparatus for executing this process has been described merely as an example of the invention as claimed. However, the present invention should not be limited in its application to the details and the constructions illustrated in the accompanying drawings and specifications, since this invention may be practiced or constructed in a variety of other different embodiments. Also, it must be understood that the terminology and descriptions employed herein are used solely for the purpose of describing the general process and the preferred embodiment, and therefore should not be construed as limitations on the operability of the invention.

I claim:

1. A method for reading periodic timing marks from a moving printing band and for generating synchronous timing signals during the passage of a missing timing mark on the printing band, said method comprising the steps of:
   (a) detecting the passage of each of said timing marks at a first location adjacent the printing band and generating a timing pulse responsive thereto;
   (b) detecting the passage of each of said timing marks at a second location adjacent the printing band and generating a timing pulse responsive thereto, said second location spaced from said first location in a direction opposite the direction of motion of said timing belt;
   (c) detecting the passage of said missing timing mark adjacent said second location; and
   (d) switching an output normally coupled to the detector at said first location for receiving said timing pulses therefrom to the detector at said second location responsive to detecting the passage of said missing timing mark adjacent said second location, whereby the output will continue to receive said timing pulses as said missing timing mark passes said first location.

2. The method as described in claim 1 further comprising the steps of:
   (e) detecting the passage of said missing timing mark adjacent said first location; and
   (f) switching said output from the detector at said second location to the detector at said first location for receiving said timing pulses therefrom responsive to the detection of the passage of said timing mark adjacent said first location.

3. The method as described in claim 2 further comprising the step of spacing said second location from said first location by a distance equal to an integral multiple of the distance between said timing marks.

4. The method as described in claim 3 wherein said second location is spaced from said first location by at least four times the distance between adjacent timing marks along the printing band.

5. The method as described in claim 3 wherein step (d) comprises the substeps of:
(d1) providing a first switching gate of the normally conducting type coupled between said first location and said output;
(d2) providing a second switching gate of the normally non-conducting type coupled between said second location and said output; and
(d3) enabling the flow of said timing pulses through said second gate and disabling the flow of said timing pulses through said first gate responsive to the detection of the passage of said missing timing mark adjacent the first location.

6. The method as described in claim 5 wherein step (f) comprises the substeps of:
(f1) enabling the flow of said timing pulses through said first gate and disabling the flow of said timing pulses through said second gate responsive to detecting the passage of said missing timing mark adjacent said first location.

7. An apparatus for reading periodic timing marks on a moving printing band and for generating periodic timing pulses in synchronism during the passage of the missing timing mark on the printing band, said apparatus comprising the combination:
a first detector position adjacent the moving printing band for sensing the passage of each of the timing marks thereon and for generating a timing pulse responsive thereto;
a second detector positioned adjacent the moving printing band for sensing the passage of each of the timing marks thereon and generating a timing pulse responsive thereto, with said second detector being spaced from said first detector in a direction opposite the direction of motion of said printing band;
primary missing mark means coupled to said second detector for sensing the passage of said missing timing mark adjacent thereto; and
switching means for coupling in a first position an output line to said first detector for receiving said timing pulses therefrom, said switching means switching into a second position for coupling said output line to said second detector responsive to said primary missing mark means sensing the passage of said missing timing mark adjacent thereto, whereby a continuous series of timing pulses are received by said output line even as said missing timing mark passes adjacent said first and second detectors.

8. The device as described in claim 7 further comprising secondary missing mark means coupled to said first detector for sensing the passage of said missing timing mark adjacent thereto, with said secondary missing mark detector coupled to said switching means for changing said switching means from said second position into said first position responsive to said secondary missing mark means sensing said missing mark, whereby a continuous sequence of timing pulses will be received by said output line from said first detector after said missing timing mark passes thereby.

9. The device as described in claim 7 wherein said second detector is spaced from said first detector by an effective distance along said printing band equal to an integral multiple of the distance between timing marks on the moving printing band.

10. The device as described in claim 9 wherein said spacing between said first and second detectors is at least four times the distance between timing marks on the moving belt.

11. The device as described in claim 8 wherein said switch means comprises in combination:
a bistable flip-flop including an output, a first input having an output of said primary missing pulse detector coupled thereto, and a second input having an output of said secondary missing pulse detector coupled thereto;
first AND gate means including an output, a first input coupled to said first detector, and a second input coupled to said output of said bistable flip-flop;
second AND gate means including an output, a first input coupled to said second detector, and a second input coupled to said output of said bistable flip-flop through an inverter; and
NOR gate means including a first input coupled to said output of said first AND gate means, and a second input coupled to said output of said second AND gate means, with an output of said NOR gate means being coupled to said output line.

12. The device as described in claim 11 wherein said primary and secondary missing mark means each comprise in combination:
a first monostable multivibrator having a time constant marginally exceeding the expected period between receiving said timing pulses, with said first monostable multivibrator generating a trigger signal at an output thereof responsive to the period between adjacent ones of said timing pulses received at an input thereof exceeding said time constant; and
a second monostable multivibrator coupled to said output of said first multivibrator for generating a switching signal for changing said switching means between said first and second positions.

* * * * *